United States Patent Office 3,523,030
Patented Aug. 4, 1970

3,523,030
PIGMENT TREATMENT
David Frederick Malin, Heywood, England, and Robert Langley, Paisley, Scotland, assignors to J. R. Geigy A.G., Basel, Switzerland
No Drawing. Filed Feb. 13, 1967, Ser. No. 615,368
Claims priority, application Great Britain, Feb. 22, 1966, 7,751/66
Int. Cl. C08h 17/14
U.S. Cl. 106—288                                    6 Claims

ABSTRACT OF THE DISCLOSURE

A process of treating a phthalocyanine blue pigment to improve the properties thereof, which process comprises mixing the phthalocyanine blue pigment, in dry pigmentary form, with a polar aliphatic solvent which is at least partially water-miscible and separating the solvent from the treated pigment, and phthalocyanine blue pigment obtained thereby.

---

The present invention relates to processes of treating an organic pigment to enhance the pigmentary properties thereof, and in particular to processes of treating phthalocyanine pigments.

It is known that crude phthalocyanine compounds, for instance a slurry of presscake of a phthalocyanine blue as prepared by conventional methods, may be treated with a variety of organic solvents to convert the crude phthalocyanine compound into pigmentary form. The crude material may, for example, be treated with the solvent so that the particles of the crude product are reduced to pigmentary size.

In British patent specification 951,820, published Mar. 11, 1964, a procedure is described for reducing the particle size of crude pigment by vigorously agitating with sodium chloride, sodium sulphate or other specified inorganic material and with a specified quantity of an organic liquid which is virtually a non-solvent for the pigment and inorganic material.

In British patent specification 951,968, published Mar. 11, 1964, there is described the formation of a slurry of a wet phthalocyanine presscake in water containing a minor amount of cyclohexanol or other specified monohydroxy alcohol, and recovering and drying the resulting pigment.

In British patent specification 956,515, published Apr. 29, 1964, there is described a procedure by which the particle size of copper phthalocyanine or other pulverisable solid is reduced by agitating with sand, glass or other grinding element of specified size and a substantially non-solvent organic liquid having a surface tension not greater than 40 dynes per centimetre at 20° C. In U.S. patent specification 3,119,706 there is described the treatment of a pigment paste by admixture with an aqueous solution of a water-soluble volatile organic liquid and a salting out agent, the organic liquid being removed by evaporation and the resulting pigment being isolated by filtration and washing with water.

Such solvent treatments have, however, been applied to wet materials to convert them into pigmentary form. We have now surprisingly found that a solvent treatment procedure applied to dry phthalocyanine compounds already in pigmentary form can be used to bring about significant improvement in the strength or brightness of the pigment.

According to the present invention, a process of treating a phthalocyanine blue pigment to improve the properties thereof comprises mixing the phthalocyanine blue pigment, in dry pigmentary form, with a polar aliphatic solvent which is at least partially water-miscible, and separating the solvent from the treated pigment.

The phthalocyanine blue pigment may be a cobalt-, zinc-, cadmium-, nickel- or other transition metal-phthalocyanine, but is preferably a copper phthalocyanine. Of the copper complexes, the pigment may be, for example, a phthalocyanine blue in either the alpha or beta form, or a mixture of the two forms The phthalocyanine material treated with the solvent in accordance with the process of the invention is in dry pigmentary form. A conventional method of preparing the pigment may be used in which the phthalocyanine compound forming the colouring matter is conditioned or after-treated by any of a variety of known methods. It may, for instance, be subjected to grinding with calcium chloride, sodium chloride, sodium acetate, sodium sulphate or other inorganic or organic salt, with or without the addition of dimethylaniline, diethylaniline, xylene or other organic solvent, or it may be heated with nitrobenzene, $\alpha$-chloronaphthalene or other high-boiling organic solvent. The pigment used in the process may also be prepared by dispersing the phthalocyanine colouring matter in water by means of pebble-milling in the presence of a dispersing agent which may be anionic, cationic or nonionic in type, and thereafter drying. If the pigment has been prepared by grinding with a salt, the dry pigment treated in accordance with the invention may, if desired, be the dry pigment/salt mixture; the presence of such a salt is, however, not necessary in order to achieve the improved pigment strength or brightness brought about by the process of the invention. The pigment may also be prepared by acid pasting, for instance by stirring with concentrated sulphuric acid at an elevated temperature, pouring the product into water, separating off the pigment and washing free from acid. While the pigment treated by the process may be in any pigmentary form, it is preferred that the average particle size of the pigment so treated is of the order of one micron.

The polar aliphatic solvent with which the pigment is treated is one which is at least partially miscible with water. The solvent may be selected from any of a wide variety of chemical compounds, and may be, for example, methanol, ethanol, n-propanol, isopropanol, n-butanol, or other lower alkanol; ethyl acetate or other lower alkyl monocarboxylate; acetone, methylethylketone or other dialkylketone; 2-methoxyethanol, 2-ethoxyethanol or other lower alkoxyalkanol; or ethylene glycol, diethylene glycol or other alkylene glycol. Conversely, treatment with aromatic non-polar solvents has been found, in contrast with the present invention, not to bring about any significant or substantial improvement in the strength or brightness of the pigment on treating with the solvent. The solvent may, if desired, contain dissolved water in a proportion insufficient to cause separation into two phase, and may thus be, for example, aqueous ethanol (for instance industrial methylated spirits), an azeotropic mixture of ethanol and water or an azeotropic mixture of isopropanol and water, the lower alkanol in each case being the major constituent.

The treatment of the pigment with the solvent may be effected under a wide variety of conditions, the particular temperature and pressure at which the treatment is effected and the time during which the pigment and solvent are contacted being dependent on the nature of the pigment and of the solvent in order to secure the optimal improvement in pigmentary properties. Although the pigment is preferably contacted with the solvent at a temperature in the range of from 10° C. to the boiling point of the solvent at the pressure applied, a temperature of from 50° C. to the boiling point is particularly preferred when the treatment is carried out at atmospheric pressure. Although a superatmospheric pressure may be applied, if desired, for example when the solvent used is highly volatile at the treatment temperature chosen, it is generally convenient to treat the pigment with the solvent at atmospheric or substantially atmospheric pressure.

The proportion of solvent with which the pigment is treated in the process to the pigment may be varied within a wide range but is preferably in the range of from 0.5 to 20 parts by weight of solvent per part by weight of pigment, the proportion of 1 to 15 (and especially 5 to 10) parts by weight of solvent per part by weight of pigment being particularly preferred. If the proportion of solvent to pigment is above that of the preferred range, no further significant improvement in the pigmentary properties of the treated pigment is achieved and solvent may be wasted. If the proportion of solvent to pigment is below that of the preferred range, the strength or brightness of the treated pigment is inferior to that of the same pigment when treated with a proportion of solvent within the preferred range.

After treatment of the pigment with the solvent, the solvent may be removed, for instance by filtering or centrifuging off the treated pigment. Subsequent washing of the treated pigment is in general unnecessary and may, in fact, have a deleterious effect on the enhanced pigmentary properties; if the treated pigment is washed, however, for instance to remove ethylene glycol or other high-boiling solvent, it is preferably washed with water or with acetone, isopropanol or other low-boiling solvent with which the high-boiling solvent is miscible.

Although this is a less preferred aspect of the invention, the pigment which is treated may be in the form of a mixture of the phthalocyanine compound with a salt, especially the mixture resulting from the preparation of the colouring matter in pigmentary form by grinding with the salt and subsequent removal of any solvent present during the grinding; the mixture of the organic solvent and pigment is, in accordance with this aspect of the invention, preferably treated by the process by admixing with a proportion of water sufficient to dissolve the salt present, the organic solvent being then distilled off from the resulting two-phase liquid mixture and the pigment obtained as residue being filtered or otherwise separated off and washed with water until salt free.

Although the degree of improvement in pigmentary properties brought about by the process of the invention depends to some extent on the pigment treated, solvent used and treatment conditions, an increase of up to about 25% in pigment strength or brightness (otherwise known as "clean-ness") of the pigment can be achieved.

Although the process of the present invention can be carried out using any phthalocyanine blue pigment in dry pigmentary form, the process may be carried out with particular advantage, according to one embodiment of the invention, using as starting material a mixture of the alpha and beta forms of phthalocyanine blue; by carrying out the procedure on such mixtures, the pigment may be converted into phthalocyanine blue which is substantially in the beta form. In this manner, beta form phthalocyanine blue pigments of high pigmenttary strength can be produced.

The following examples further illustrate the present invention. Parts by weight shown therein bear the same relation to parts by volume as do kilograms to litres. Parts and percentages are expressed by weight unless otherwise stated.

EXAMPLE 1

60 parts of beta form copper phthalocyanine in dry powder form were added to 300 parts of isopropanol. The resulting mass was agitated and heated to 60° C. Heating was continued for 2 hours and the suspension was filtered to remove isopropanol. The filter cake was heated in an air oven at 60° C. to remove the remaining solvent.

The resulting pigment, as compared with the original beta form copper phthalocyanine before treatment with the solvent, was 10% stronger tinctorially and was cleaner in print tone.

By carrying out the same procedure, using methanol, ethanol, n-butanol or acetone instead of the isopropanol, similar improvement in tinctorial strength and brightness is achieved.

On repeating the procedure described in Example 1 on a metal-free phthalocyanine pigment and on a phthalocyanine green pigment, no significant increase in tinctorial strength and brightness was achieved.

EXAMPLE 2

Crude copper phthalocyanine was salt milled with a mixture of calcium chloride and sodium acetate in the presence of diethylaniline to produce beta form copper phthalocyanine in pigmentary form. 160 parts of this mixture containing 40 parts of the pigment were thoroughly mixed with 200 parts of acetone and the mixture was maintained at 15° C. for 72 hours. The resulting mass was then added to 1000 parts by volume of water containing 20 parts of concentrated hydrochloric acid. The mixture was stirred at 70° C. until all the acetone had been distilled off as acetone/water azeotrope.

The pigment was then filtered and was washed with water, to remove water-soluble salt, and then dried by heating in air at 60° C. The pigment thus obtained was 10% stronger than was the same material which had not been subjected to the solvent treatment and was cleaner in tint.

EXAMPLE 3

60 parts of beta form copper phthalocyanine were stirred in 300 parts of diethylene glycol for three hours while maintaining the temperature of the mixture at 80° C. 300 parts by volume of water were then added; the pigment was filtered, washed with water to remove residual diethylene glycol, and dried in air at 60° C.

The pigment thus produced was 15% stronger than the original untreated material and was cleaner in print tone.

EXAMPLE 4

60 parts of beta form copper phthalocyanine were thoroughly mixed with 60 parts of diethylene glycol and the mixture was maintained at 50° C. for a period of 15 hours. To the product was then added 500 parts by volume of water heated to 50° C. and the resulting mixture was stirred.

The pigment produced was then filtered off, washed with water to remove diethylene glycol, and dried in air at 60° C. The dry pigment was 15% stronger than the original untreated copper phthalocyanine and was cleaner in tone.

EXAMPLE 5

168 parts of a calcium chloride/copper phthalocyanine mixture, containing 60 parts of copper phthalocyanine, which had been ground in the pressure of diethylaniline so that the mixture contained 50% of the copper phthalocyanine in the alpha form (the remainder being in the beta form) was stirred with 300 parts by volume of isopropanol/water azeotrope for 2 hours at 60° C. 250 parts by volume were then added and the resulting mixture was stirred continuously until the calcium chloride present had dissolved.

The isopropanol/water azeotrope was then distilled off, 20 parts of concentrated hydrochloric acid added and, after stirring for 15 minutes, the aqueous pigment suspension was filtered. The filter cake was washed with water heated to 50° C. to remove soluble salt, and the pigment was dried in air at 60° C. The resulting pigment was 100% beta form copper phthalocyanine, having superior tinctorial strength (25% stronger) and clean print tone as compared with beta form copper phthalocyanine prepared by the salt grinding alone. Furthermore, the pigment produced had a greener shade than the mixture of alpha and beta forms of copper phthalocyanine on which the treatment was carried out.

EXAMPLE 6

20 parts of copper phthalocyanine, which contained 17% alpha form and 83% beta form, was stirred with 100 parts of isopropanol for 2 hours at 60° C. 83 parts by volume of water, containing 20 parts of sodium chloride in solution, were then added; the concentration of the sodium chloride in the resulting mixture was sufficient to bring about the formation of liquid phases. The mixture was then heated to 80° C. and isopropanol distilled off as the water azeotrope. The pigment was then filtered off, washed free from sodium chloride, and dried in an air oven at 60° C.

The resulting pigment was 100% beta form copper phthalocyanine and was 10% stronger than beta form pigment obtained by salt grinding. Furthermore the pigment produced had a greener shade than the mixture of alpha and beta forms of copper phthalocyanine on which the treatment was carried out.

EXAMPLE 7

Crude copper phthalocyanine was ground with anhydrous sodium sulphate until the alpha form content was at least 95% of the total alpha form and beta form copper phthalocyanine. The dry pigment/salt mixture, containing 60 parts of copper phthalocyanine, was stirred for 3 hours at 60° C. with 300 parts by volume of isopropanol/water azeotrope. Water was then added to dissolve the sodium sulphate present.

The isopropanol was then distilled off, as the water azeotrope, and the pigment was filtered off, washed free from sulphate, and dried in air at 60° C. The resulting pigment was 5% stronger than the initial material before treatment with the isopropanol, and was brighter in print tone.

EXAMPLE 8

Copper phthalocyanine pigment composed of 65% alpha form and 35% beta form, was stirred with five times its weight of isopropanol for 2 hours at 60° C. The solvent was then removed, and the pigment was filtered off and dried in air at 60° C.

The pigment produced contained 35% of the copper phthalocyanine in the alpha form and 65% in the beta form, and was 15% stronger than the original untreated material and was cleaner in tone.

EXAMPLE 9

60 parts of copper phthalocyanine, containing 3% combined chlorine, were added to 420 parts of 98% sulphuric acid and stirred for 2 hours at 60° C. The resulting solution was run into 1000 parts by volume of water during 20 minutes while maintaining the temperature below 20° C.

The resulting pigment was then filtered off, washed free of acid and then re-dispersed in 300 parts of ethylene glycol. The mixture was heated to 110° C. to distil off the water present; the pigment residue was stirred for 3 hours at 100° C., filtered, washed free from ethylene glycol with water and dried in air at 60° C.

The pigment thus produced was 10% stronger than the untreated pigment when tested in an alkyd resin paint medium.

EXAMPLE 10

60 parts of copper phthalocyanine, composed of 20% alpha form and 80% beta form, were refluxed with 300 parts of acetone for 4 hours. The pigment was then filtered off and dried in air at 60° C.

The treated pigment was 100% beta form copper phthalocyanine and was 15% stronger than beta copper phthalocyanine prepared by salt grinding and was cleaner in tint. Furthermore, the pigment produced had a greener shade than the mixture of alpha and bet forms of copper phthalocyanine before the treatment had been carried out.

EXAMPLE 11

30 parts of copper phthalocyanine, composed of 50% alpha form and 50% beta form, were stirred in 150 parts of n-butanol at 75° C., for 8 hours. The pigment was filtered off and dried in air at 60° C.

The treated pigment was 100% beta form copper phthalocyanine, and was 15% stronger than beta copper phthalocyanine prepared by salt grinding and was cleaner in tint. Furthermore, the pigment produced had a greener shade than the mixture of alpha and beta forms of copper phthalocyanine before the treatment had been carried out.

EXAMPLE 12

30 parts of copper phthalocyanine, composed of 45% alpha form and 55% beta form, were stirred in 150 parts of ethylene glycol for 15 hours at 70° C. The pigment was filtered off, washed with water to remove ethylene glycol at 50° C. and then dried in air at 60° C.

The resulting pigment was 100% beta form copper phthalocyanine, and was 10% stronger than beta copper phthalocyanine prepared by salt grinding and was cleaner in print tone. Furthermore, the pigment produced had a greener shade than the untreated copper phthalocyanine.

Instead of using water in washing the filtered treated pigment to remove ethylene glycol, acetone, isopropanol or other low-boiling organic solvent with which ethylene glycol is miscible can be used.

We claim:

1. A process for increasing the strength and brightness of copper phthalocyanine blue in dry pigmentary form, consisting essentially of the steps of:
    (a) mixing the pigment with 0.5 to 20 parts by weight of a polar aliphatic solvent, which is at least partially water miscible, per part by weight pigment at a temperature within the range of from 10° C. to the boiling point of the solvent for a time sufficient to increase the strength and brightness thereof and
    (b) separating the solvent from the treated pigment.

2. A process as claimed in claim 1 wherein the polar aliphatic solvent used in step (a) is a member selected from the group consisting of lower alkanols, lower alkyl monocarboxylates, dialkylketones, lower alkoxyalkanols and alkylene glycols.

3. A process as claimed in claim 2 wherein the said polar aliphatic solvent is a member selected from the group consisting of methanol, ethanol, n-propanol, isopropanol, n-butanol, ethyl acetate, acetone, methylethylketone, 2-methoxyethanol, 2-ethoxyethanol, ethylene glycol, diethylene glycol.

4. A process as claimed in claim 1 wherein the polar aliphatic solvent used in step (a) contains dissolved water in a proportion insufficient to cause separation into two phases.

5. A process as claimed in claim 1 wherein the mixing of the dry pigment with the polar aliphatic solvent in step (a) is effected at a temperature range of from 50° C. to the boiling point of the solvent.

6. A process as claimed in claim 1 wherein the proportion of polar solvent with which the pigment is mixed in step (a) is in the range of from 5 to 10 parts by weight per part by weight of pigment.

References Cited

UNITED STATES PATENTS

| 2,556,727 | 6/1951 | Lane et al. | 106—288 |
| 2,723,981 | 11/1955 | Tullsen | 106—288 |
| 2,805,957 | 9/1957 | Ehrich | 106—288 |
| 2,933,505 | 4/1960 | Jackson | 106—288 |
| 3,351,481 | 11/1967 | Hopmeier et al. | 106—288 |

JAMES E. POER, Primary Examiner

U.S. Cl. X.R.

106—309